United States Patent
Chen et al.

(10) Patent No.: US 12,493,118 B2
(45) Date of Patent: Dec. 9, 2025

(54) INTEGRATED SURVEILLANCE RADAR SYSTEM

(71) Applicant: Honeywell International Inc., Charlotte, NC (US)

(72) Inventors: Zhong Chen, Beijing (CN); Rong Lu, Beijing (CN)

(73) Assignee: Honeywell International Inc., Charlotte, NC (US)

(*) Notice: Subject to any disclaimer, the term of this patent is extended or adjusted under 35 U.S.C. 154(b) by 385 days.

(21) Appl. No.: 17/807,842

(22) Filed: Jun. 20, 2022

(65) Prior Publication Data
US 2023/0408684 A1    Dec. 21, 2023

(51) Int. Cl.
G01S 13/931    (2020.01)
G01S 13/02     (2006.01)
G01S 13/08     (2006.01)
G01S 13/86     (2006.01)
H01Q 1/32      (2006.01)

(52) U.S. Cl.
CPC .......... G01S 13/931 (2013.01); G01S 13/08 (2013.01); G01S 13/867 (2013.01); H01Q 1/3233 (2013.01); G01S 2013/0245 (2013.01)

(58) Field of Classification Search
CPC ............... G01S 13/931; G01S 13/08; G01S 2013/0245; H01Q 1/3233
See application file for complete search history.

(56) References Cited

U.S. PATENT DOCUMENTS

| | | |
|---|---|---|
| 6,414,712 B1 | 7/2002 | Wanielik et al. |
| 8,604,968 B2 | 12/2013 | Alland et al. |
| 9,671,493 B1 | 6/2017 | Khosla et al. |

(Continued)

FOREIGN PATENT DOCUMENTS

| | | | |
|---|---|---|---|
| CN | 217467176 U | * | 9/2022 |
| CN | 116559869 A | * | 8/2023 |

(Continued)

OTHER PUBLICATIONS

"'Kraken' provides needed intelligence, force protection at NIE", U.S. Army, Retrieved from: http://www.army.mil/article/64655/., Accessed on on Aug. 31, 2011, 4 pp.

(Continued)

Primary Examiner — William Kelleher
Assistant Examiner — Noah Yi Min Zhu
(74) Attorney, Agent, or Firm — Shumaker & Sieffert, P.A.

(57) ABSTRACT

A method of vehicle navigation includes controlling a phased array radar to search for an object within a first field of view and receiving a first direction, having a first direction resolution, and a first range, having first range resolution, of the object from the phased array radar. The method includes controlling a camera to search for the object based on the first direction and the first range within a second field of view that is smaller than the first field of view, and receiving a second direction of the object from the camera, wherein the second direction has a second direction resolution that is finer than the first direction resolution. The method includes outputting at least one of the second direction or the first range, and navigating the vehicle based on the at least one of the second direction or the first range.

17 Claims, 4 Drawing Sheets

(56) References Cited

U.S. PATENT DOCUMENTS

| | | | |
|---|---|---|---|
| 10,157,524 B2 | 12/2018 | Blech et al. | |
| 10,353,066 B2 | 7/2019 | Schwager et al. | |
| 10,721,384 B2 | 7/2020 | Schwager et al. | |
| 11,035,945 B2 | 6/2021 | Philipp et al. | |
| 2007/0146195 A1 | 6/2007 | Wallenberg et al. | |
| 2017/0038466 A1* | 2/2017 | Salmén | G01S 7/497 |
| 2019/0137619 A1* | 5/2019 | Fetterman | G01S 13/931 |
| 2019/0204423 A1* | 7/2019 | O'Keeffe | G01S 17/89 |
| 2020/0267323 A1 | 8/2020 | Zhou et al. | |
| 2020/0382707 A1 | 12/2020 | Berton et al. | |
| 2021/0195112 A1* | 6/2021 | Verghese | G08G 1/048 |
| 2021/0253116 A1* | 8/2021 | Ben-Ezra | G01S 17/931 |
| 2021/0278257 A1* | 9/2021 | Dharia | G01S 17/89 |
| 2021/0316723 A1* | 10/2021 | Yamakawa | G01S 7/415 |

FOREIGN PATENT DOCUMENTS

| | | | |
|---|---|---|---|
| CN | 116685876 A * | 9/2023 | G01S 13/887 |
| EP | 3887856 A1 | 10/2021 | |
| WO | 2020107048 A1 | 6/2020 | |
| WO | 2021210268 A1 | 10/2021 | |

OTHER PUBLICATIONS

"Blighter Explorer Portable Radar and Camera System," (2014), Retrieved from: http://www.blighter.com/products/blighter-explorer.html, Accessed on Sep. 26, 2021, 2 pp.

"QinetiQ Security & Defence Contractors" QinetiQ, Retrieved from: https://www.qinetiq.com/en-us/?Page=manufacturingServicesCerberus-, Accessed on Sep. 26, 2021, 2 pp.

"Radar Video Surveillance (RVS) Brochure—Automated Detection, Tracking, and Video Response to Security Threats", Retrieved from: http://www.honeywellintegrated.com/products/integrated-security/video/976-30.html, Oct. 2006, 2 pp.

Krahnstoever et al., "Collaborative Real-Time Control of Active Cameras in Large Scale Surveillance Systems", Workshop on Multi-camera and Multi-modal Sensor Fusion Algorithms and Applications—M2SFA2, Oct. 5, 2008, 12 pp.

Qureshi et al., "Surveillance Camera Scheduling: A Virtual Vision Approach", Multimedia Systems, Nov. 8, 2006, 9 pp.

Van Den Broek et al., "Automatic detection of hostile behaviour," Proceedings vol. 7480, Unmanned/Unattended Sensors and Sensor Networks VI; 74800R , Sep. 24, 2009, 12 pp.

Barry et al., "The Secure Perimeter Awareness Network (SPAN) at John F. Kennedy International Airport", 2007 41st Annual IEEE International Carnahan Conference on Security Technology, Oct. 8-11, 2007, pp. 183-188.

Radar Video Surveillance (RVS) Overview (Feb. 26, 2007), http://www.honeywellintegrated.com/products/integrated-security/video/976-30.html, 17 pp.

Schwering et al., "Application of heterogeneous multiple camera system with panoramic capabilities in a harbor environment," Proceedings vol. 7481, Electro-Optical and Infrared Systems: Technology and Applications VI; 74810C, Sep. 23, 2009, 12 pp.

Extended Search Report from counterpart European Application No. 23178744.1 dated Nov. 20, 2023, 8 pp.

Response to Extended Search Report dated Nov. 20, 2023, from counterpart European Application No. 23178744.1 filed Jun. 10, 2024, 21 pp.

* cited by examiner

INTEGRATED SURVEILLANCE RADAR SYSTEM

TECHNICAL FIELD

The disclosure relates to navigation and object detection.

BACKGROUND

Cameras and radar are commonly included in vehicles, including unmanned aerial vehicles (UAVs) and urban air mobility vehicles such as helicopters and flying taxis. In most instances, optical cameras have a high angular resolution, and radar has a high distance resolution.

SUMMARY

Vehicle navigation systems and techniques described herein may improve navigation, object detection, object tracking, and detection and avoidance by integrating imaging and radar systems.

In one example, this disclosure describes a method of vehicle navigation including: controlling, by processing circuitry, a phased array radar to search for an object within a first field of view; receiving, by the processing circuitry and from the phased array radar, a first direction and a first range of the object, wherein the first direction has a first direction resolution and the first range has a first range resolution; controlling, by the processing circuitry, a camera to search for the object based on the first direction and the first range and within a second field of view that is smaller than the first field of view; receiving, by the processing circuitry and from the camera, a second direction of the object, wherein the second direction has a second direction resolution that is finer than the first direction resolution; outputting, by the processing circuitry, at least one of the second direction or the first range; and navigating, based on the at least one of the second direction or the first range, the vehicle.

In another example, this disclosure describes a method of vehicle navigation including: controlling, by processing circuitry, a camera to search for an object within a first field of view; receiving, by the processing circuitry and from the camera, a first direction and a first range of the object, wherein the first direction has a first direction resolution and the first range has a first range resolution; controlling, by the processing circuitry, a phased array radar to search for the object based on the first direction and the first range and within a second field of view that is smaller than the first field of view; receiving, by the processing circuitry and from the phased array radar, a second range of the object, wherein the second range has a second range resolution that is finer than the first range resolution; outputting, by the processing circuitry, at least one of the first direction or the second range; and navigating, based on the at least one of the second direction or the first range, the vehicle.

In another example, this disclosure describes a system including: a camera; a phased array radar; and processing circuitry configured to: control the phased array radar to search for an object within a first field of view; receive, from the phased array radar, a first direction and a first range of the object, wherein the first direction has a first direction resolution and the first range has a first range resolution; control the camera to search for the object based on the first direction and the first range and within a second field of view that is smaller than the first field of view; receive, from the camera, a second direction of the object, wherein the second direction has a second direction resolution that is finer than the first direction resolution; output at least one of the second direction or the first range; and navigate, based on the at least one of the second direction or the first range, the vehicle. The details of one or more examples are set forth in the accompanying drawings and the description below. Other features, objects, and advantages will be apparent from the description and drawings, and from the claims.

DETAILED DESCRIPTION

Figure 1:
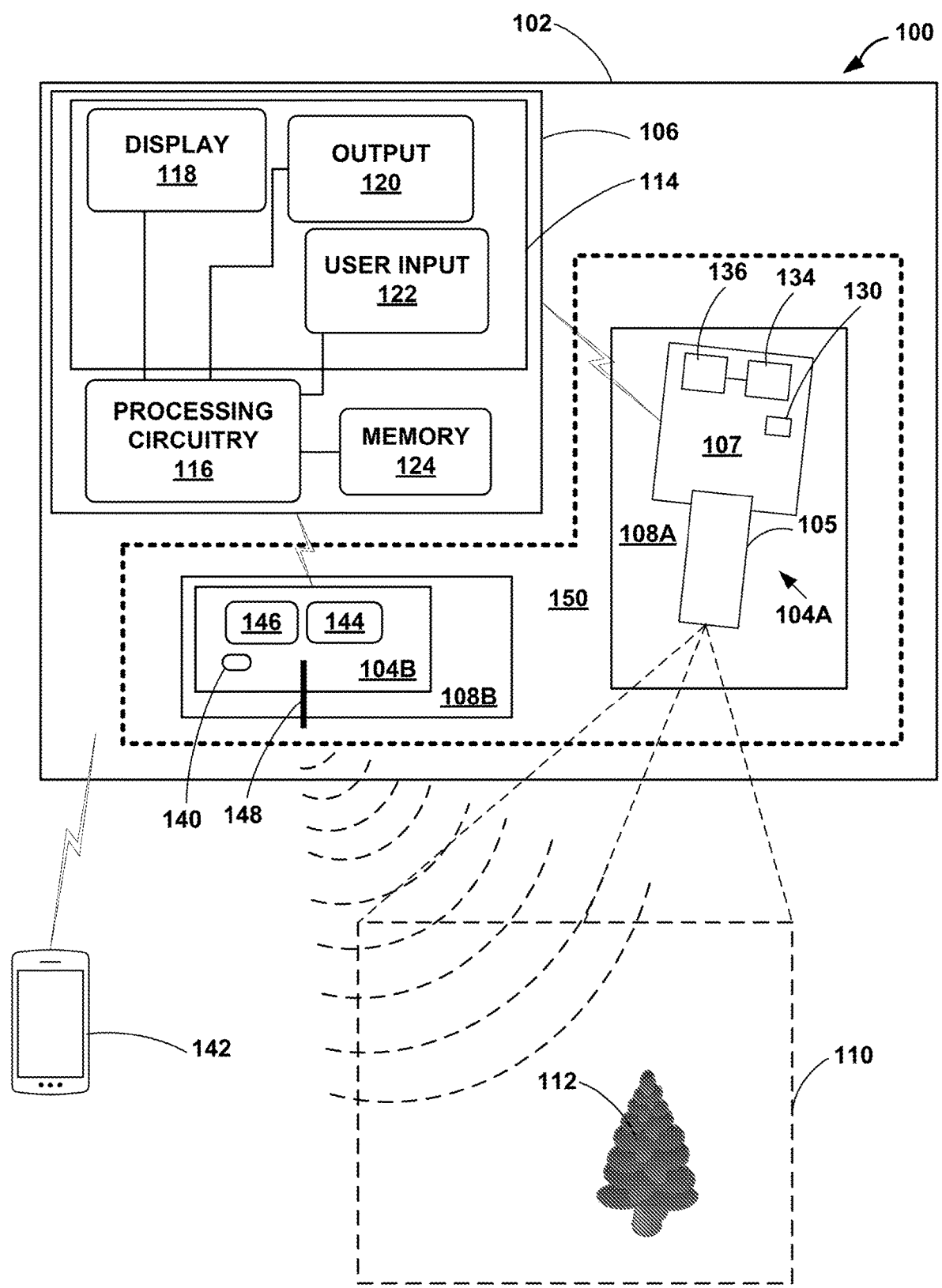
FIG. 1 is a conceptual diagram of an example vehicle navigation system, in accordance with one or more techniques of this disclosure.

In some examples, this disclosure describes methods and systems of object detection and/or object tracking using one or more cameras and one or more radar systems. In some examples, this disclosure describes methods and systems of vehicle navigation including using one or more cameras and one or more radar systems attached to a vehicle for object detection and/or object tracking, e.g., for collision avoidance. Increased use and acceptance of autonomous vehicles may depend on the ability of such vehicles to autonomously perform, and be in compliance with, the operational requirements of a driver, pilot, and the like, e.g., such as "see and avoid" collisional avoidance functionality. For example, Detect and Avoid (DAA) technology may be an alternative means of compliance with "see and avoid" requirements on the operation of a vehicle, and DAA may include a wide variety of sensors and detectors used for collision avoidance such as active surveillance radar (e.g., a Mode C/Mode S Interrogator), broadcast automatic dependent surveillance (ADS-B), universal access transceivers (UATs), optical radar, advanced tactical acquisition radar (ATAR), or the like.

In the context of aviation, ATAR may include an Airborne Primary Radar which may detect non-cooperative targets, e.g., objects without collision avoidance that will not, or cannot, cooperate to avoid a collision. However, ATAR may be complex, heavy, expensive, and have a high-power consumption. To detect objects far away, ATAR may be equipped with powerful radio frequency (RF) transmitters, high sensitivity RF receivers and strong processing capability to process RF signals reflected from distant targets. Unmanned aircraft system (UAS) and/or urban air mobility (UAM) vehicles may have weight requirements precluding conventional active radar systems as a part of on-board DAA. A relatively small, lightweight ATAR system may tradeoff angular resolution, e.g., via a reduction in transmitter size and power and/or receiver size and sensitivity. DAA technology may additionally or alternatively use imaging via camera systems. Camera systems may have an increased angular resolution relative to conventional ATAR, however, detection of relatively distant objects via camera systems may be limited by the resolution of the camera detection array and/or the performance of its imaging optics performance. Camera systems may improve distance detection via optical lenses, e.g., via zooming in for higher resolution, but trade off both field of view and response time, e.g., by incurring an increased amount of time to move (pan and/or tilt), zoom to acquire multiple fields of view, scan a larger field of view, or the like.

In accordance with one or more techniques of this disclosure, a system and/or method may integrate a radar system and an imaging system for object detection. In some examples, a system includes a phased-array radar (PAR) and video camera including a zoom lens. The PAR and camera are configured to bidirectionally calibrate and/or adjust one or more of the other camera or PAR parameters, e.g., a parameter of the PAR may be adjusted and/or fine-tuned based on a parameter and/or determination of the camera, or the camera may be adjusted and/or fine-tuned based on a parameter and/or determination of the PAR.

The present disclosure improves the range resolution and angular resolution (e.g., range accuracy and angular and/or directional accuracy, such as azimuth resolution and/or elevation resolution) of object detection by coordinating the use of an integrated radar and imaging system to take advantage of the relative advantages or strengths of each system, e.g., range resolution for radar and angular and/or directional resolution (e.g., azimuth/elevation resolutions) for a camera system. For example, for a given size, weight, and power of each of the radar system and the camera system, the techniques disclosed provide an improved range resolution and angular resolution, and thereby provide improved object detection. The techniques disclosed also enable a reduction in size, weight, and power of an object detection system, e.g., each of the integrated radar and camera systems, for a given range resolution and angular resolution, for example to provide a smaller, lightweight, lower cost, lower power consumption DAA system suitable for on-board vehicle application, including aircraft such as UAS. As used herein, "direction" may include one or both of an azimuth angle and an elevation angle, and direction resolution may be one or both of an azimuth resolution and an elevation resolution.

FIG. 1 is a conceptual diagram of a vehicle navigation system 100, in accordance with one or more techniques of this disclosure. In the example shown, vehicle navigation system 100 includes vehicle 102, computing device 106 and/or mobile computing device 142, camera 104A, PAR 104B, camera orienting system 108A, and PAR orienting system 108B (e.g., orienting systems 108A and 108B). In some examples, a field of view of camera 104A and a field of view of PAR 104B (e.g., range of angles into which PAR 104B emits a radar signal and from which PAR 104B receives return signals) may include real-world scene 110, and real-world scene 110 may include object 112. Object 112 may be, for example, an object of importance, an object of interest, a tracking object, an object to be avoided or navigated around, another moving object or vehicle, or the like.

In some examples, vehicle 102 may be a UAV, a helicopter, an aircraft, a watercraft such as a ship, a boat, a submarine, etc., a land-based vehicle such as a car, truck, van, etc., a bicycle, or any type of motor-powered or human-powered vehicle. Vehicle 102 may be any vehicle capable of mounting a gimbal. In the example shown, vehicle 102 includes computing device 106 and orienting systems 108A and 108B. In some examples, computing device 106 may be located remote to vehicle 102, e.g., computing device may be mobile computing device 142.

Computing device 106 and/or mobile computing device 142 may communicate with vehicle 102 and/or orienting systems 108A and 108B via a communication interface. In some examples, camera orienting system 108A and PAR orienting system 108B may be the same orienting system, e.g., camera 108A and PAR 108B may be mounted on the same gimbal and/or orienting system. In other examples, orienting systems 108A and 108B may be different from each other and/or independent of each other.

In some examples, one or both of orienting systems 108A and 108B may be a multi-axis gimbal, for example, a two-axis gimbal, a three-axis gimbal, or any type of gimbal. In some examples, orienting systems 108A and 108B may be an active gimbal, e.g., a motorized gimbal configured to move about one or more axes via one or more motors causing a rotation. In other examples, orienting systems 108A and 108B may be a passive gimbal, e.g., a non-motorized gimbal that may include weights to counteract changes in direction. In other examples, orienting systems 108A and 108B may be any type of system configured to orient a camera system or a PAR to view a desired scene or to direct a field of view of a camera system or PAR in a particular direction, e.g., so as to include real-world scene 110 in the field of view of the camera system and/or PAR. In the example shown, camera 104A including lens 105 may be removably attached to orienting system 108A and PAR 104B including transceiver 148 may be removably attached to orienting system 108B.

In the example shown, camera 104A includes camera body 107 and lens 105. In some examples, camera body 107 may include an imaging sensor, such as a focal plane array of light sensitive pixels configured to capture an image of a scene imaged by lens 105. Camera body 107 may provide structure for the mounting of lens 105 relative to the imaging sensor, as well as for mounting and protection of other sensors, e.g., an inertial measurement unit (IMU) 130, and camera processing circuitry, e.g., to control auto-focus, zoom, changing the lens aperture, imaging sensor exposure (integration time), receive image data from the imaging sensor, control and receive data from the IMU, and the like. In some examples, lens 105 may be a variable lens, e.g., a zoom lens and/or telephoto lens having a variable focal length. In other examples, lens 105 may be detachable from camera 104A, and an alternative lens may replace lens 105, for example, a wide-angle lens, a wavelength-filtered lens, and the like.

In some examples, camera 104A may be configured to capture one or more images of a real-world scene, e.g., real-world scene 110. Camera 104A may be any type of camera or video camera capable of capturing at least one image, and/or a sequence of images, and/or video. The sequence of images may be two or more images taken at regular or irregular intervals. For example, a sequence of images may include a video stream of images taken at 5 Hz, 10 Hz, 15 Hz, 30 Hz, 60 Hz, 200 Hz, 350 Hz, 500 Hz, 1000 Hz, or at any other frequency usable for tracking objects.

In some examples, camera 104A may include IMU 130. IMU 130 may be a 3-axis, 6-axis, or 9-axis IMU. For example, IMU 130 may include a 3-axis accelerometer configured to detect linear acceleration in three principal directions. IMU 130 may further include a 3-axis gyroscope configured to detect rotational rate about three principal directions, e.g., IMU 130 may be a 6-axis device. IMU 130 may further include a 3-axis magnetometer configured to detect a magnetic field as a heading reference, e.g., IMU 130 may be a 9-axis device. IMU 130 may include one accelerometer, gyroscope, and magnetometer for three vehicle axes, e.g., pitch, roll, and yaw. IMU 130 may also include a temperature sensor. For example, IMU 130 may be a ten degree of freedom IMU including a 3-axis accelerometer, a 3-axis gyroscope, a 3-axis magnetometer, and a temperature sensor. In some examples, temperature sensor data from IMU 130 temperature sensor may be used to correct for temperature biases in certain IMU 130 sensors, such as microelectromechanical systems (MEMs) accelerometer sensors.

In some examples, camera 104A may be communicatively coupled, for example by a wired or a wireless connection, to computing device 106 and/or mobile computing device 142 and a captured image, image sequence, video, etc., may be transferred to computing device 106 and/or mobile computing device 142, for example, for image processing such as that described below. Camera 104A may also transfer IMU motion information, e.g., linear acceleration, rotation rate, and heading for three vehicle axes, to computing device 106 and/or mobile device 142. In some examples, camera 104A may include processing circuitry 136 and memory 134 and may process the IMU motion information, image and/or video without transferring the image and/or video to computing device 106 and/or mobile computing device 142.

In the example shown, PAR 104B transceiver 148. In some examples, PAR 104B may include structure for the mounting of transceiver 148, e.g., a PAR housing, as well as for mounting and protection of other sensors, e.g., an IMU 140, and PAR processing circuitry, e.g., to control PAR parameters such as frequency, amplitude, beam direction (e.g., azimuth and elevation), beam shape (e.g., planar, spherical, cylindrical, or the like), phase shift, receive gain/sensitivity, or any suitable PAR parameter, as well as receive radar data from one or more receiver elements of transceiver 148, control and receive data from IMU 140, and the like. In some examples, PAR 104B may be a passive PAR, an active PAR, a hybrid beam forming PAR, a digital beam forming PAR, any other suitable PAR type or combination thereof. In some examples, PAR 104B includes a conformal antenna.

In some examples, PAR 104B may be configured to capture, detect, measure, determine, or the like, a distance, angle, and radial velocity of one or more objects 112 of real-world scene 110 relative to PAR 104B. PAR 104B may be any type of PAR, e.g., a passive PAR, an active PAR, a hybrid beam forming PAR, a digital beam forming PAR, any other suitable PAR type or combination thereof. In some examples, PAR 104B includes a conformal antenna.

In some examples, transceiver 148 may include an array antenna, e.g., a plurality of individual antenna elements oriented in relationship to each other (e.g., with a particular arrangement and/or spacing). In some examples, transceiver 148 may comprise a transmitter configured to feed a radio frequency current to the antenna array, and each antenna element of the array may include a phase shifting element. Processing circuitry 146 (or processing circuitries 116, 136) may control the transmitter and phase shifting elements for form one or more beams of radio waves. Transceiver 148 may comprise a single receiver configured to receive radio frequency current from one or more antennas. In some examples, receiver is configured to receive radio frequency current from the same antenna array that the transmitter is configured to feed the radio frequency current to. In some examples, the transmitter and receiver may be the same component configured to perform both functionalities, e.g., feeding a radio frequency current to the one or more antennas and receiving radio frequency current from the one or more antennas. In other examples, PAR 104B may include any combination of transmitters, receivers, and antenna elements, e.g., individual antenna elements including one or both of a transmitter and receiver, sub-arrays of a plurality of individual antenna elements electrically coupled to one or more transmitter and/or receivers, or all of the plurality of antenna elements electrically coupled to one or both of a single transmitter and/or receiver.

In some examples, PAR 104B may include IMU 140. IMU 140 may be substantially similar to IMU 130 described above. For example, IMU 140 may be a 3-axis, 6-axis, or 9-axis IMU. For example, IMU 140 may include a 3-axis accelerometer configured to detect linear acceleration in three principal directions. IMU 140 may further include a 3-axis gyroscope configured to detect rotational rate about three principal directions, e.g., IMU 140 may be a 6-axis device. IMU 140 may further include a 3-axis magnetometer configured to detect a magnetic field as a heading reference, e.g., IMU 140 may be a 9-axis device. IMU 140 may include one accelerometer, gyroscope, and magnetometer for three vehicle axes, e.g., pitch, roll, and yaw. IMU 140 may also include a temperature sensor. For example, IMU 140 may be a ten degree of freedom IMU including a 3-axis accelerometer, a 3-axis gyroscope, a 3-axis magnetometer, and a temperature sensor. In some examples, temperature sensor data from IMU 140 temperature sensor may be used to correct for temperature biases in certain IMU 140 sensors, such as microelectromechanical systems (MEMs) accelerometer sensors.

In some examples, PAR 104B may be communicatively coupled, for example by a wired or a wireless connection, to computing device 106 and/or mobile computing device 142 and radar data (e.g., distances, angles, and radial velocities of one or more objects 112) may be transferred to computing device 106 and/or mobile computing device 142, for example, for processing such as that described below. PAR 104B may also transfer IMU motion information, e.g., linear acceleration, rotation rate, and heading for three vehicle axes, to computing device 106 and/or mobile device 142. In some examples, PAR 104B may include processing circuitry 146 and memory 144 and may process the IMU motion information, image and/or video without transferring the image and/or video to computing device 106 and/or mobile computing device 142. In some examples, processing circuitry 146 and memory 144 may be substantially similar to processing circuitry 136 and memory 134 described herein.

Description and references in this disclosure with respect to computing device 106 apply equally to mobile computing device 142 unless stated otherwise. In the illustrated example, computing device 106 may include processing circuitry 116 coupled to memory 124 and to display 118, output 120, and user input 122 of a user interface 114. Processing circuitry 116 of computing device 106, as well as processing circuitry 136 of camera 104B and processing circuitry 146 of PAR 104B, and other processing modules or circuitry described herein, may be any suitable software, firmware, hardware, or combination thereof. Processing circuitries 116, 136, and 146 may include any one or more microprocessors, controllers, digital signal processors (DSPs), application specific integrated circuits (ASICs), field-programmable gate arrays (FPGAs), graphical processing units (GPUs), or discrete logic circuitry. The functions attributed to processors described herein, including processing circuitries 116, 136, and 146, may be provided by processing circuitry of a hardware device, e.g., as supported by software and/or firmware.

In some examples, processing circuitry 116, as well as processing circuitries 136 and 146, is configured to determine orientation information associated with tracking an object 112 in a real-world scene 110. For example, processing circuitry 116 may determine pan, roll, and tilt angles for orienting system 108A and/or orienting system 108B to center object 112 in the field of view of camera 104B or within the range of steerable angles of PAR 104B (e.g., a radar "field of view"), based on an image, or images, of real-world scene 110 captured by camera 104B and/or radar data (e.g., range, angle, and radial velocity) captured by PAR 104B. Processing circuitries 116, 136, and 146 may perform any suitable signal processing of a sequence of images and/or radar data to filter the sequence of images and/or radar data, such as any suitable band-pass filtering, adaptive filtering, closed-loop filtering, any other suitable filtering, analytical, regression, machine learning, or processing as described herein, and/or any combination thereof. Processing circuitries 116, 136, and 146 may also receive input signals from IMU 130 containing motion information. Processing circuitries 116, 136, and 146 may also receive input signals from additional sources (not shown). For example, processing circuitries 116, 136, and 146 may receive an input signal containing position information, such as Global Navigation Satellite System (GNSS) coordinates of vehicle 102. Additional input signals may be used by processing circuitries 116, 136, and 146 in any of the calculations or operations performed by processing circuitries 116, 136, and 146. In some examples, processing circuitries 116, 136, and 146 may be adapted to execute software, which may include an operating system and one or more applications, as part of performing the functions described herein. In some examples, processing circuitries 116, 136, and 146 may include one or more processing circuitry modules for performing each or any combination of the functions described herein.

In some examples, processing circuitry 116 may be coupled to memory 124, processing circuitry 136 may be coupled to memory 134, and processing circuitry 146 may be coupled to memory 144. Memory 124, as well as memory 134 and memory 144, may include any volatile or non-volatile media, such as a random-access memory (RAM), read only memory (ROM), non-volatile RAM (NVRAM), electrically erasable programmable ROM (EEPROM), flash memory, and the like. Memory 124, 134, and 144 may be a storage device or other non-transitory medium. Memory 124, 134, and 144 may be used by processing 116, 136, and 146, respectively, for example, to store information corresponding vehicle 102 position and/or tracking object 112. In some examples, processing 116, 136, and 146 may store measurements, previously received data from an image or a sequence of images in memory 124, 134, and 144, respectively, and/or calculated values for later retrieval.

Processing circuitry 116 may be coupled to user interface 114 including display 118, user input 122, and output 120. In some examples, display 118 may include one or more display devices (e.g., monitor, personal digital assistant (PDA), mobile phone, tablet computer, any other suitable display device, or any combination thereof). For example, display 118 may be configured to display an image and/or tracking information. In some examples, user input 122 is configured to receive input from a user, e.g., information corresponding to vehicle 102, orienting systems 108A and 108B, and/or camera 104A and PAR 104B. For example, a user may input information such as camera parameters, e.g., camera type, lens focal length, exposure time, video capture rate, lens aperture, or the like, and/or PAR parameters, e.g., frequency, amplitude, beam direction, beam shape, phase shift, receive gain/sensitivity, or the like.

User input 122 may include components for interaction with a user, such as a keypad and a display, which may be the same as display 118. In some examples, the display may be a cathode ray tube (CRT) display, a liquid crystal display (LCD) or light emitting diode (LED) display and the keypad may take the form of an alphanumeric keypad or a reduced set of keys associated with particular functions. User input 122, additionally or alternatively, include a peripheral pointing device, e.g., a mouse, via which a user may interact with the user interface. In some examples, the displays may include a touch screen display, and a user may interact with user input 122 via the touch screens of the displays. In some examples, the user may also interact with user input 122 remotely via a networked computing device.

In the example shown, real-world scene 110 may include one or more objects within the field of view of camera 104A and/or the field of view of PAR 104B (e.g., within the range of steerable angles of PAR 104B), such as object 112.

To track an object in real-world scene 110, such as object 112, orienting system 108A and/or 108B may change one or more of a pan, roll, and tilt angle. In some examples, computing device 106, angle based on one or more captured images, may automatically determine one or more of a pan, roll, and tilt angle that keep the object 112 at substantially the same position within the field of view of camera 104A and/or PAR 104B. For example, at a point in time, computing device 106 may automatically determine one or more pan, roll and tilt angle of orienting system 108A and/or 108B at which object 112 will be substantially centered in the field of view of camera 104A and/or PAR 104B based on the position and motion of the image of object 112 within one or more previously captured images, and/or based on previously determined ranges, angles, and radial velocities and/or changes, or rates of changes, of the range, angle, and radial velocity of object 112. Computing device 106 may then cause orienting system 108A and/or 108B to move to the determined pan, roll, and tilt angle and computing system 106 may cause camera 104A to capture one or more additional images and/or PAR 108B to measure additional radar data.

In the example shown, camera 104A and PAR 104B are configured to bidirectionally calibrate and/or adjust one or more of each other's parameters. For example, a system may be configured to cause PAR 104B to search for a target object 112 within a large field of view with a coarse ranging and angular resolution, e.g., so as to identify and determine the object 112 within a reasonable amount of time. PAR 104B may determine a first, lower resolution (e.g., coarse) direction (e.g., azimuth and/or elevation) and range of the target object 112. The system may be configured to then orient camera 104B in the determined first direction with a zoom and focus determined based on the first determined range. The system may determine the zoom of lens 105 such that the field of view of camera 104A is less than the field of view of PAR 104B during the first coarse search, e.g., so as to determine the direction of the target object 112 with an increased (e.g., finer) angular resolution. Camera 104A may capture one or more images of the target object 112, and determine a second direction of the target object 112 with a finer direction resolution (e.g., a finer azimuth resolution and/or a finer elevation resolution) than the first direction determined by PAR 104B during the coarse search, e.g., based on the one or more captured images. The system may then navigate vehicle 102 based on the first range and second direction. In some examples, the system may be configured to orient or re-orient PAR 104B based on the second direction, and to cause PAR 104B to perform a finer search, e.g., with a beam having a decreased solid angle, scanning the beam with finer angular steps and/or a decreased solid angle and/or within a decreased field of view. PAR 104B may then determine the range of target object 112 with an increased range resolution, e.g., a finer range resolution based on a radar signal increased (relative to the coarse search) by virtue of the changed radar parameters (e.g., beam shape, dwell time at a particular angle, scanning/sweeping resolution, time, and/or range, or the like).

In the example above, parameters of camera 104A, e.g., orienting direction of orienting system 108A and the zoom and focus of lens 105, are determined based on one or more determinations of PAR 104B, e.g., the first direction and range. In some examples, parameters of camera 104A may be determined based on parameters of PAR 104B, e.g., the coarse search parameters. Additionally, parameters of PAR 104B are subsequently determined based on one or more determinations and/or parameters of camera 104A in a similar manner. In some examples, parameters of camera 104A may be determined based on determinations and/or parameters of PAR 10B, followed by parameters of PAR 104B being determined by determinations and/or parameters of camera 104A for a plurality of iterations, e.g., to determine the direction and range of object 112 with further refined (e.g., increased and/or finer) precision, accuracy, and resolution. In the example described, the initial coarse search is performed by PAR 104B. In other examples, the system may be configured to cause camera 1054A to perform the initial coarse search.

Figure 2:
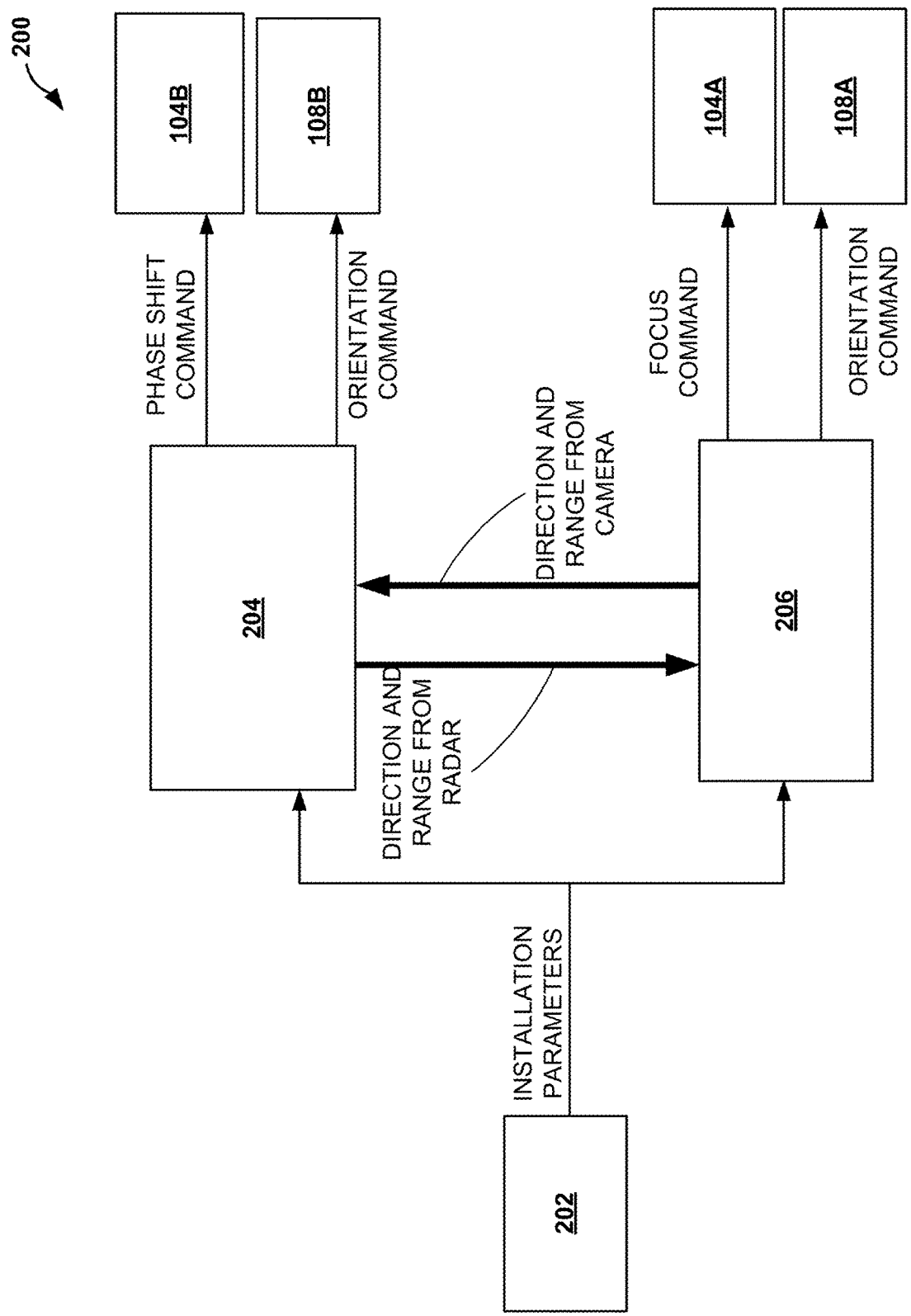
FIG. 2 is a conceptual diagram of an example system including an active 3-axis gimbal, in accordance with one or more techniques of this disclosure.

FIG. 2 is a conceptual diagram of an example object detection system 200, in accordance with one or more techniques of this disclosure. In the example shown, object detection system 200 includes configuration module 202, PAR control module 204, camera control module 206, PAR 104B and orienting system 108B, and camera 104A and orienting system 108A.

Configuration module 202 may include camera 104A and PAR 104B configuration data. For example, configuration module 202 may store configuration data via any or all of memory 124, 134, and 144. For example, configuration module 202 may store and be configured to send/receive data such as the positioning of camera 104A and orienting system 108A, and PAR 104B and orienting system 108B, relative to vehicle 102, gains for orienting systems 108A and 108B, current vehicle 102 position and attitude (e.g., pitch, roll, yaw), with PAR control module 204 and/or camera control module 206. In some examples, configuration module 202 may include and/or use any or all of processing circuitries 116, 136, and 146.

PAR control module 204 may be configured to control orienting system 108B and PAR 104B, e.g., to determine, set, and/or adjust one or more parameters of orienting system 108B and PAR 104B. PAR control module 204 may be configured to execute detection of object 112 via PAR 104B, e.g., to execute radar beam steering, shaping, and collection and processing of radar return signal data. For example, PAR control module 204 may be configured to control one or more transmitters of PAR 104B to output and/or feed radio frequency current to one or more antenna elements, control one or more phase shifting elements to shape and/or steer radio wave beams, and control one or more receives to receive radio frequency current from one or more antenna elements. In some examples, PAR control module 204 may be configured to control the frequency, amplitude, beam shape, and/or beam direction of radio waves emitted by PAR 104B. In some examples, PAR control module 204 may be configured to control orienting system 104B, e.g., to orient PAR 104B in a particular direction. In some examples, PAR control module 204 is configured to process radar data (e.g., beam parameters and/or received radar return signals) to determine object 112 and/or an direction and range of object 112, e.g., relative to PAR 104B. In some examples, PAR control module 204 may include and/or use any or all of processing circuitries 116, 136, and 146 or memory 124, 134, 144.

Camera control module 206 may be configured to control orienting system 108A and camera 104A, e.g., to determine, set, and/or adjust one or more parameters of orienting system 108A and camera 104A. Camera control module 204 may be configured to execute detection of object 112 via Camera 104A, e.g., to execute camera orienting via orienting system 108A, zoom, focus, and aperture (e.g., the F/# and/or aperture stop size) of lens 105, the shutter speed, exposure and/or integration time of camera 104A, video rate of image sequence capture (e.g., video capture), or the like. In some examples, camera control module 206 is configured to process one or more capture images to determine object 112 and/or an direction and range of object 112, e.g., relative to camera 104A. In some examples, camera control module 206 may include and/or use any or all of processing circuitries 116, 136, and 146 or memory 124, 134, 144.

In some examples, one or both of PAR control module 204 and/or camera control module 206 are configured to control one or both of orienting systems 108A and/or 108B. In some examples, system 200 may include one orienting system, e.g., orienting system 108A, to which one or both of camera 104A and/or PAR 104B is attached. Either or both of PAR control module 204 and camera control module 206, may be configured to control the single orienting system.

Figure 3:
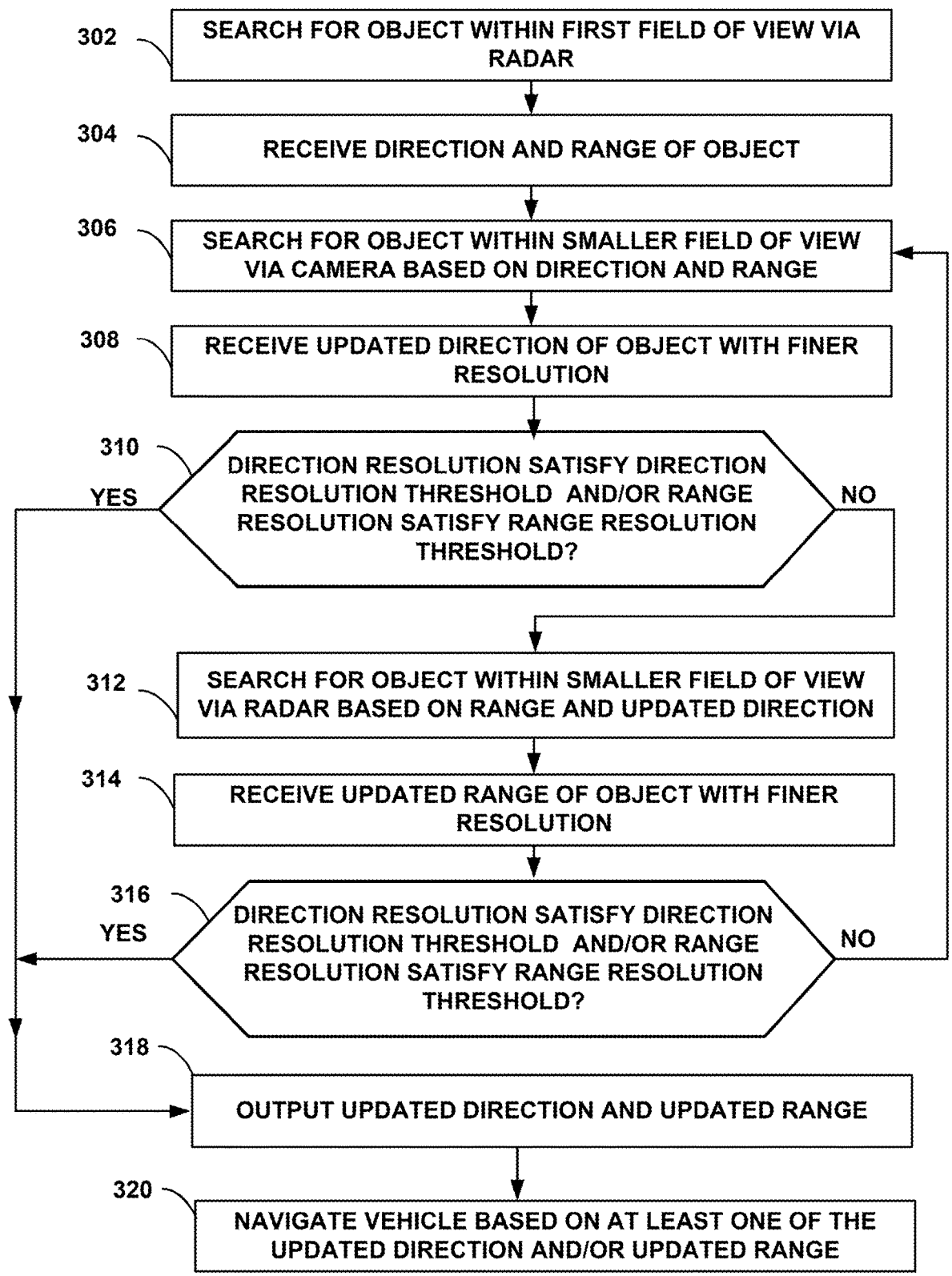
FIG. 3 is a flow diagram of an example method of detecting an object, in accordance with one or more techniques of this disclosure.
Figure 4:
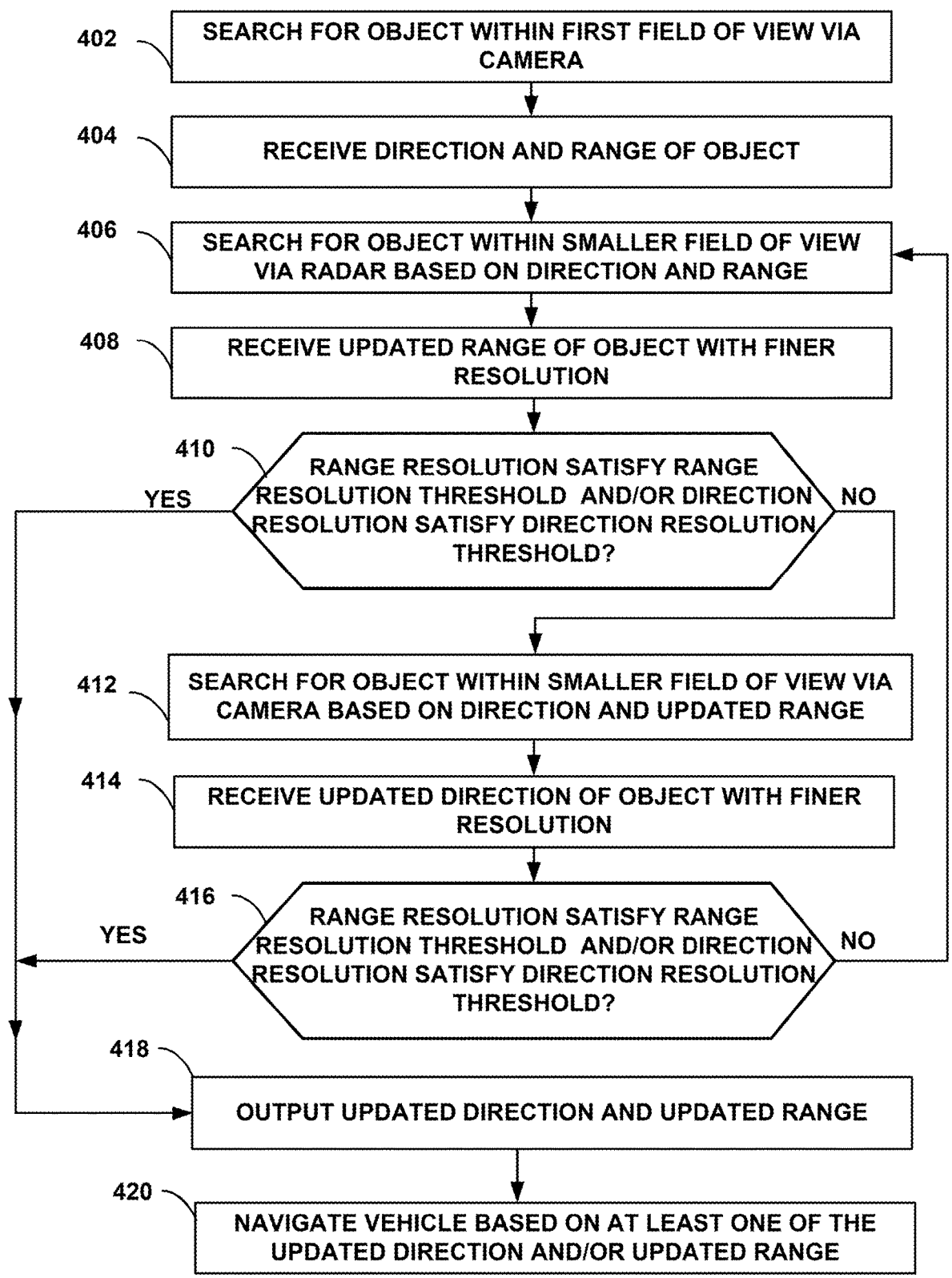
FIG. 4 is a flow diagram of another example method of detecting an object, in accordance with one or more techniques of this disclosure.

FIGS. 3 and 4 are flow diagrams of example methods of detecting an object. In examples according to the disclosure, a system including integrated camera and radar systems detect and/or track an object via a radar-initiated and/or a camera-initiated method. FIG. 3 is a flow diagram of an example radar-initiated method of detecting an object, in accordance with one or more techniques of this disclosure. FIG. 4 is a flow diagram of an example camera-initiated method of detecting an object, in accordance with one or more techniques of this disclosure. While FIGS. 3 and 4 are described with reference to vehicle navigation system 100, object detection system 200, and control circuitries 116, 136, and/or 146, in other examples, the techniques may be performed by another system, alone or in combination with vehicle navigation system 100, object detection system 200, and processing circuitries 116, 136, and/or 146. Although described in terms of object detection, in some examples the techniques may be and/or include object tracking, vehicle navigation, collision avoidance, threat detection, or the like. The methods of FIGS. 3 and 4 may be executed, for example, by computing device 106 in communication with any and/or all of vehicle 102, configuration module 202, camera 104A and/or camera control module 204, PAR 104B and/or PAR control module 206, and orienting systems 108A and 108B.

Referring now to FIG. 3, one or more of processing circuitries 116, 136, and/or 146 control PAR 104B to search for an object within a first field of view (302). For example, processing circuitries 116, 136, and/or 146 may control PAR 104B to execute a "coarse" search with a large radar search field of view. For example, processing circuitries 116, 136, and/or 146 may cause PAR 104B to emit a radar beam covering a predetermined field of view, e.g., a broadcast spherical radar beam (e.g., having spherical wavefronts), or any suitably shaped radar beam, subtending a predetermined solid angle. Alternatively, or additionally, processing circuitries 116, 136, and/or 146 may cause PAR 104B to scan and/or sweep a spherical, cylindrical, collimated, or otherwise shaped beam through a plurality of angles within a range of angles defining the first field of view, e.g., where the first field of view subtends a larger solid angle than that of the radar beam. For example, processing circuitries 116, 136, and/or 146 may control PAR 104B to emit a radar signal with a first intensity within the first field of view. Generally, the smaller the solid angle of a radar beam generated by PAR 104B, the larger the intensity of the radar signal and the larger the return signal from an object. However, the smaller the solid angle of a radar beam generated by PAR 104B, the longer the time and/or number of angles at which PAR 104B may need to scan/sweep to cover the first field of view, e.g., there is a tradeoff between time and/or angular resolution and radar signal strength. In some examples, processing circuitries 116, 136, and/or 146 may be configured to reduce angular resolution in favor of time, radar strength, or both, during a coarse search for a target.

Processing circuitries 116, 136, and/or 146 receive, from PAR 104B, a first direction and a first range of the object, where the first direction has a first direction resolution and the first range has a first range resolution (304). For example, PAR 104B may acquire the object during the coarse search, and may determine the direction and range of the target with only a coarse angular resolution (e.g., only a coarse azimuth resolution and/or only a coarse elevation resolution) and distance/range resolution.

Processing circuitries 116, 136, and/or 146 control camera 104A to search for the object based on the first direction and the first range and within a second field of view that is smaller than the first field of view (306). For example, processing circuitries 116, 136, and/or 146 may control orienting system 108A to direct camera 104A in the first direction and cause lens 105 to zoom and focus based on the first range, e.g., to acquire one or more images of the object. Processing circuitries 116, 136, and/or 146 may control and/or cause lens 105 to "zoom-in" on the object based on the first range, e.g., to increase the effective focal length of lens 105 thereby decreasing the field of view of camera 104A. In other words, processing circuitries 116, 136, and/or 146 may control lens 105 to have a second field of view (e.g., a camera 104A search field of view) that is smaller than the first field of view of PAR 104B during the coarse search (e.g., a PAR 104B search field of view). For example, the solid angle subtended by lens 105 and the detection array of camera 104B is smaller than that of the solid angle subtended by the entire search field of view of PAR 104B at (302), e.g., so as to acquire images of the object with an increased spatial and/or angular resolution. In some examples, the solid angle subtended by lens 105 and the detection array of camera 104B is smaller than that of the solid angle subtended by the entire search field of view of PAR 104B at (302) at least on one direction, e.g., at least one of the azimuth or the elevation angle directions. In some examples, searching for, and determining an direction and range of, the object within the smaller field of view, e.g., the second field of view, by camera 104A is less than the time it would otherwise take to search for, and determining an direction and range of, the object within the first field of view by camera 104A.

Processing circuitries 116, 136, and/or 146 receive, from the camera 104A, a second direction of the object, wherein the second direction has a second direction resolution that is finer than the first direction resolution (308). For example, camera 104A may acquire one or more images of the object and, based on the one or more images, may determine an updated direction (and in some examples, an updated range) of the object with an increased, e.g., finer, angular/directional resolution (and in some examples, a finer distance/range resolution).

Processing circuitries 116, 136, and/or 146 determine whether the updated direction resolution (and/or updated range resolution) satisfies an direction resolution threshold (and/or a range resolution threshold) (310). For example, processing circuitries 116, 136, and/or 146 may determine one or both of an direction resolution and range resolution needed to navigate vehicle 102 with enough certainty as to the location and/or trajectory of one or more objects, including the detected object. If the updated direction having the finer direction resolution satisfies the threshold (e.g., the "YES" branch at (310)), the method may proceed to (318). In other words, if system 100 and/or 200 detects the object with enough position and/or trajectory resolution to precisely know where the object currently is and/or will be at a predetermined time in the future, the method may proceed to output of the updated direction and range having the updated (e.g., finer) direction resolution and range resolution. If the updated direction having the finer direction resolution does not satisfy the threshold (e.g., the "NO" branch at (310)), the method may proceed to (312). In other words, if system 100 and/or 200 detects the object, but without enough position and/or trajectory resolution to precisely know where the object currently is and/or will be at a predetermined time in the future, the method may continue to refine the direction and range detection with finer resolution, e.g., greater precision.

Processing circuitries 116, 136, and/or 146 control PAR 104B to search for the object based on the updated (e.g., second) direction and the first range and within a smaller (e.g., third) field of view that is smaller than a previous field of view (e.g., at least one of the first or second fields of view (312). For example, processing circuitries 116, 136, and/or 146 may control orienting system 108B to direct PAR 104B in the updated (e.g., second) direction and to search for, and detect, the object within a smaller, updated (e.g., third) PAR 104B search field of view. The smaller, updated PAR 104B search field of view may be smaller than at least one of the first field of view, e.g., the previous PAR 104B search field of view, or the second field of view, e.g., the previous camera 104A search field of view. In other words, processing circuitries 116, 136, and/or 146 control PAR 104B to execute a "fine" or "finer" search with a reduced PAR 104B search field of view subtending a smaller solid angle than the previous PAR 104B or pervious camera 104A search fields of view. For example, processing circuitries 116, 136, and/or 146 may cause PAR 104B to emit a radar beam covering the smaller, updated PAR 104B search field of view, e.g., a broadcast spherical radar beam (e.g., having spherical wavefronts), or any suitably shaped radar beam, subtending a solid angle less than the previous PAR 104B search field of view solid angle or the previous camera 104A search field of view solid angle. For example, processing circuitries 116, 136, and/or 146 control PAR 104B to search for the object within the third field of view (e.g., the updated, PAR 104B search field of view) by emitting a radar signal with a second intensity that is greater than the first intensity (e.g., at (302)) via concentrating the signal to be emitted within the updated PAR 104B search field of view (e.g., the "third" field of view) rather than within the previous PAR 104B search field of view (e.g., the "first" field of view). Alternatively, or additionally, processing circuitries 116, 136, and/or 146 may cause PAR 104B to scan and/or sweep a spherical, cylindrical, collimated, or otherwise shaped "scanning" beam through a plurality of angles within a range of angles defining the smaller, updated PAR 104B search field of view, e.g., where the smaller, updated PAR 104B search field of view subtends a larger solid angle than that of the radar scanning beam, and in some examples, where the scanning beam subtends a smaller solid angle than the previous PAR 104B scanning beam. In other words, based on the parameters and/or updated direction (and possibly updated range) from camera 104A, processing circuitries 116, 136, and/or 146 control PAR 104B to focus the search within a smaller range of angles.

Processing circuitries 116, 136, and/or 146 receive, from PAR 104B, a second, e.g., updated, range of the object with a second, updated PAR 104B range resolution that is finer than the previous PAR 104B range resolution (314). In some examples, processing circuitries 116, 136, and/or 146 may additionally receive an updated direction with an updated, finer direction resolution. In some examples, PAR 104B has superior ranging compared with camera 104A, and camera 104A has superior angular resolution compared with PAR 104B. As the integrated camera 104A and PAR 104B system iterates to zoom in and determine the direction and range of the object with increasing precision, PAR 104B contributes to determining the range of the object with increasing resolution/precision, and camera 104A contributes to determining the direction of the object with increasing resolution/precision. In some examples, PAR 104B may contribute to determining an direction of the object with an increased direction resolution, e.g., relative to the previous direction and direction resolution determined by camera 104A, and camera 104A may contribute to determining a range of the object with an increased range resolution, e.g., relative to the previous range and range resolution determined by PAR 104B. For example, processing circuitries 116, 136, and/or 146 may control camera 104A to search for the object based on the most recent direction received from the PAR 104B having a finer direction resolution compared to the previous direction, and processing circuitries 116, 136, and/or 146 may control PAR 104B to search for the object based on the most recent range received from camera 104B having a finer range resolution compared to the previous range.

Processing circuitries 116, 136, and/or 146 determine whether the updated range resolution and/or direction resolution satisfy the range resolution threshold and/or the direction resolution threshold (316). For example, processing circuitries 116, 136, and/or 146 may determine one or both of an direction resolution and range resolution needed to navigate vehicle 102 with enough certainty as to the location and/or trajectory of one or more objects, including the detected object, as described above. If the updated direction having the finer direction resolution satisfies the threshold (e.g., the "YES" branch at (316)), the method may proceed to (318). In other words, if system 100 and/or 200 detects the object with enough position and/or trajectory resolution to precisely know where the object currently is and/or will be at a predetermined time in the future, the method may proceed to output the updated range and direction having the updated (e.g., finer) range resolution and direction resolution. If the updated range having the finer range resolution does not satisfy the threshold (e.g., the "NO" branch at (316)), the method may proceed to (306). In other words, if system 100 and/or 200 detects the object, but without enough position and/or trajectory resolution to precisely know where the object currently is and/or will be at a predetermined time in the future, the method may continue to refine the direction and range detection with finer resolution, e.g., greater precision, via iterating through steps (306) through (316). For example, processing circuitries 116, 136, and/or 146 may repeatedly control camera 104A and PAR 104B to search for, and acquire, the object within a plurality of progressively smaller fields of view until at least one of a most recent direction resolution satisfies the threshold direction resolution or a most recent range resolution satisfies the threshold range resolution.

Processing circuitries 116, 136, and/or 146 output at least one of the updated direction or the updated range (318). For example, processing circuitries 116, 136, and/or 146 may output the most recent, updated direction and/or range with the finest direction resolution and finest range resolution. In some examples, processing circuitries 116, 136, and/or 146 output at least one of the updated direction or the first range at (318), e.g., if the threshold conditions of (310) are satisfied after a single iteration.

Processing circuitries 116, 136, and/or 146 then navigate the vehicle based on the at least one of the updated (e.g., second direction) or the updated (e.g., second) range (320). In some examples, processing circuitries 116, 136, and/or 146 navigate the vehicle based on at least one of the updated direction or the first range at (320), e.g., if the threshold conditions of (310) are satisfied after a single iteration.

Referring now to FIG. 4, one or more of processing circuitries 116, 136, and/or 146 control camera 104A to search for an object within a first field of view (402). For example, processing circuitries 116, 136, and/or 146 may control camera 104A to execute a "coarse" search with a large camera search field of view. For example, processing circuitries 116, 136, and/or 146 may cause lens 105 to have a focus and zoom (e.g., effective focal length) and cause camera 104A to capture one or more images including an object, e.g., a target object.

Processing circuitries 116, 136, and/or 146 receive, from camera 104A, a first direction and a first range of the object, where the first direction has a first direction resolution and the first range has a first range resolution (404). For example, processing circuitries 116, 136, and/or 146 may determine that the object is included in the one or more captured images, and based on the one or more captured images including the object, processing circuitries 116, 136, and/or 146 may determine and/or receive the first direction and first range of the target with only a coarse angular and distance/range resolution.

Processing circuitries 116, 136, and/or 146 control PAR 104B to search for the object based on the first direction and the first range and within a second field of view that is smaller than the first field of view (406). For example, processing circuitries 116, 136, and/or 146 may control orienting system 108B to direct PAR 104B in the first direction and cause PAR 104B to emit a radar beam covering a PAR 104B search field of view, e.g., a broadcast spherical radar beam (e.g., having spherical wavefronts), or any suitably shaped radar beam, subtending a solid angle smaller than the solid angle subtended by lens 105 at (402). Alternatively, or additionally, processing circuitries 116, 136, and/or 146 may cause PAR 104B to scan and/or sweep a spherical, cylindrical, collimated, or otherwise shaped beam through a plurality of angles within a range of angles defining the second, smaller field of view. For example, processing circuitries 116, 136, and/or 146 may control PAR 104B to emit a radar signal with a first intensity within the second, smaller field of view. In other words, processing circuitries 116, 136, and/or 146 may control PAR 104B to have a second field of view (e.g., a PAR 104B search field of view) that is smaller than the first field of view of camera during the coarse search (e.g., a camera 104A search field of view). For example, the solid angle subtended by the second PAR 104B search field of view is smaller than the solid angle subtended by lens 105 and the detection array of camera 104B at (402), e.g., so as to acquire images of the object with an increased range resolution. In some examples, searching for, and determining an direction and range of, the object within the smaller field of view, e.g., the second field of view, by PAR 104B is less than the time it would otherwise take to search for, and determining an direction and range of, the object within the first field of view by PAR 104B.

Processing circuitries 116, 136, and/or 146 receive, from the PAR 104B, a second range of the object, wherein the second range has a second range resolution that is finer than the first range resolution (408). For example, PAR 104B may determine an updated range (and in some examples, an updated direction) of the object with an increased, e.g., finer, range resolution (and in some examples, a finer angular/directional resolution).

Processing circuitries 116, 136, and/or 146 determine whether the updated range resolution (and/or updated range resolution) satisfies an direction resolution threshold (and/or a range resolution threshold) (410). For example, processing circuitries 116, 136, and/or 146 may determine one or both of an direction resolution and range resolution needed to navigate vehicle 102 with enough certainty as to the location and/or trajectory of one or more objects, including the detected object. If the updated range having the finer range resolution satisfies the threshold (e.g., the "YES" branch at (410)), the method may proceed to (418). In other words, if system 100 and/or 200 detects the object with enough position and/or trajectory resolution to precisely know where the object currently is and/or will be at a predetermined time in the future, the method may proceed to output of the updated range and direction having the updated (e.g., finer) range resolution and direction resolution. If the updated range having the finer range resolution does not satisfy the threshold (e.g., the "NO" branch at (410)), the method may proceed to (412). In other words, if system 100 and/or 200 detects the object, but without enough position and/or trajectory resolution to precisely know where the object currently is and/or will be at a predetermined time in the future, the method may continue to refine the direction and range detection with finer resolution, e.g., greater precision.

Processing circuitries 116, 136, and/or 146 control camera 104A to search for the object based on the updated (e.g., second) range and the first direction and within a smaller (e.g., third) field of view that is smaller than a previous field of view (e.g., at least one of the first or second fields of view (412). For example, processing circuitries 116, 136, and/or 146 may control orienting system 108A to direct camera 104A in the updated (e.g., second) direction and to search for, and detect, the object within a smaller, updated (e.g., third) camera 104A search field of view. The smaller, updated camera 104A search field of view may be smaller than at least one of the first field of view, e.g., the previous camera 104A search field of view, or the second field of view, e.g., the previous PAR 104B search field of view. In other words, processing circuitries 116, 136, and/or 146 control camera 104A to execute a "fine" or "finer" search with a reduced camera 104A search field of view subtending a smaller solid angle than the previous camera 104A or pervious PAR 104B search fields of view. For example, processing circuitries 116, 136, and/or 146 may cause lens 105 to zoom and focus based on the second range, e.g., to acquire one or more images of the object. Processing circuitries 116, 136, and/or 146 may control and/or cause lens 105 to "zoom-in" on the object based on the second range, e.g., to increase the effective focal length of lens 105 thereby decreasing the field of view of camera 104A, e.g., so as to acquire images of the object with an increased spatial and/or angular resolution.

Processing circuitries 116, 136, and/or 146 receive, from camera, a second, e.g., updated, direction of the object with a second, updated camera 104A direction resolution that is finer than the previous camera 104A direction resolution (414). In some examples, processing circuitries 116, 136, and/or 146 may additionally receive an updated range with an updated, finer range resolution. In some examples, as described above, PAR 104B has superior ranging compared with camera 104A, and camera 104A has superior angular resolution compared with PAR 104B. As the integrated camera 104A and PAR 104B system iterates to zoom in and determine the direction and range of the object with increasing precision, PAR 104B contributes to determining the range of the object with increasing resolution/precision, and camera 104A contributes to determining the direction of the object with increasing resolution/precision. In some examples, PAR 104B may contribute to determining an direction of the object with an increased direction resolution, e.g., relative to the previous direction and direction resolution determined by camera 104A, and camera 104A may contribute to determining a range of the object with an increased range resolution, e.g., relative to the previous range and range resolution determined by PAR 104B. For example, processing circuitries 116, 136, and/or 146 may control camera 104A to search for the object based on the most recent direction received from the PAR 104B having a finer direction resolution compared to the previous direction, and processing circuitries 116, 136, and/or 146 may control PAR 104B to search for the object based on the most recent range received from camera 104B having a finer range resolution compared to the previous range.

Processing circuitries 116, 136, and/or 146 determine whether the updated range resolution and/or direction resolution satisfy the range resolution threshold and/or the direction resolution threshold (416). For example, processing circuitries 116, 136, and/or 146 may determine one or both of an direction resolution and range resolution needed to navigate vehicle 102 with enough certainty as to the location and/or trajectory of one or more objects, including the detected object, as described above. If the updated direction having the finer direction resolution satisfies the threshold (e.g., the "YES" branch at (416)), the method may proceed to (418). In other words, if system 100 and/or 200 detects the object with enough position and/or trajectory resolution to precisely know where the object currently is and/or will be at a predetermined time in the future, the method may proceed to output the updated range and direction having the updated (e.g., finer) range resolution and direction resolution. If the updated range having the finer range resolution does not satisfy the threshold (e.g., the "NO" branch at (416)), the method may proceed to (406). In other words, if system 100 and/or 200 detects the object, but without enough position and/or trajectory resolution to precisely know where the object currently is and/or will be at a predetermined time in the future, the method may continue to refine the direction and range detection with finer resolution, e.g., greater precision, via iterating through steps (406) through (416). For example, processing circuitries 116, 136, and/or 146 may repeatedly control camera 104A and PAR 104B to search for, and acquire, the object within a plurality of progressively smaller fields of view until at least one of a most recent direction resolution satisfies the threshold direction resolution or a most recent range resolution satisfies the threshold range resolution.

Processing circuitries 116, 136, and/or 146 output at least one of the updated direction or the updated range (418). For example, processing circuitries 116, 136, and/or 146 may output the most recent, updated direction and/or range with the finest direction resolution and finest range resolution. In some examples, processing circuitries 116, 136, and/or 146 output at least one of the updated direction or the first range at (418), e.g., if the threshold conditions of (410) are satisfied after a single iteration.

Processing circuitries 116, 136, and/or 146 then navigate the vehicle based on the at least one of the updated (e.g., second direction) or the updated (e.g., second) range (420). In some examples, processing circuitries 116, 136, and/or 146 navigate the vehicle based on at least one of the updated direction or the first range at (420), e.g., if the threshold conditions of (410) are satisfied after a single iteration.

The following is a non-limiting list of examples that are in accordance with one or more techniques of this disclosure.

Example 1: A method of vehicle navigation includes: controlling, by processing circuitry, a phased array radar to search for an object within a first field of view; receiving, by the processing circuitry and from the phased array radar, a first direction and a first range of the object, wherein the first direction has a first direction resolution and the first range has a first range resolution; controlling, by the processing circuitry, a camera to search for the object based on the first direction and the first range and within a second field of view that is smaller than the first field of view; receiving, by the processing circuitry and from the camera, a second direction of the object, wherein the second direction has a second direction resolution that is finer than the first direction resolution; outputting, by the processing circuitry, at least one of the second direction or the first range; and navigating, based on the at least one of the second direction or the first range, the vehicle.

Example 2: The method of example 1, further including: controlling, by the processing circuitry, the phased array radar to search for the object based on the second direction and the first range and within a third field of view that is less than at least one of the first field of view or the second field of view; receiving, by the processing circuitry and from the phased array radar, a second range of the object, wherein the second range has second range resolution that is finer than the first range resolution; outputting, by the processing circuitry, at least one of the second direction or the second range; and navigating, based on the at least one of the second direction and the second range, the vehicle.

Example 3: The method of example 2, further including: determining, by the processing circuitry, whether the second direction resolution satisfies a threshold direction resolution and whether the second range resolution satisfies a threshold range resolution, wherein outputting at least one of the second direction or the second range is based on at least one of the second direction resolution satisfying the threshold direction resolution or the second range resolution satisfying the threshold range resolution.

Example 4: The method of example 3, further including: repeatedly controlling, by the processing circuitry, the camera and the phased array radar to search for the object within a plurality of progressively smaller fields of view until at least one of a most recent direction resolution satisfies the threshold direction resolution or a most recent range resolution satisfies the threshold range resolution; outputting, by the processing circuitry and based on at least one of a most recent direction resolution satisfying the threshold direction resolution or a most recent range resolution satisfying the threshold range resolution, the most recent direction and the most recent range; and navigating, based on the at least one of the most recent direction and the most recent range, the vehicle.

Example 5: The method of example 4, wherein controlling the camera to search for the object is based on the most recent direction received from the phased array radar having a finer direction resolution compared to the previous direction, and wherein controlling the phased array radar to search for the object is based on the most recent range received from the camera having a finer range resolution compared to the previous range.

Example 6: The method of any one of examples 1 through 5, wherein controlling the phased array radar to search for an object within the first field of view comprises emitting a radar signal with a first intensity within the first field of view, wherein controlling the phased array radar to search for the object within the third field of view comprises emitting a radar signal with a second intensity that is greater than the first intensity via concentrating the signal emitted within the first field of view to be within the third field of view.

Example 7: The method of any one of examples 1 through 6, wherein a time to search for the object within the second field of view by the camera is less than a time to search for the object within the first field of view by the camera.

Example 8: A method of vehicle navigation including: controlling, by processing circuitry, a camera to search for an object within a first field of view; receiving, by the processing circuitry and from the camera, a first direction and a first range of the object, wherein the first direction has a first direction resolution and the first range has a first range resolution; controlling, by the processing circuitry, a phased array radar to search for the object based on the first direction and the first range and within a second field of view that is smaller than the first field of view; receiving, by the processing circuitry and from the phased array radar, a second range of the object, wherein the second range has a second range resolution that is finer than the first range resolution; outputting, by the processing circuitry, at least one of the first direction or the second range; and navigating, based on the at least one of the second direction or the first range, the vehicle.

Example 9: The method of example 8, further including: controlling, by the processing circuitry, the camera to search for the object based on the first direction and the second range and within a third field of view that is less than at least one of the first field of view of the second field of view; receiving, by the processing circuitry and from the camera, a second direction of the object, wherein the second direction has second direction resolution that is finer than the first direction resolution; outputting, by the processing circuitry, at least one of the second direction or the second range; and navigating, based on the at least one of the second direction and the second range, the vehicle.

Example 10: The method of example 9, further including: determining, by the processing circuitry, whether the second direction resolution satisfies a threshold direction resolution and whether the second range resolution satisfies a threshold range resolution, wherein outputting at least one of the second direction or the second range is based on at least one of the second direction resolution satisfying the threshold direction resolution or the second range resolution satisfying the threshold range resolution.

Example 11: The method of example 10, further including: repeatedly controlling, by the processing circuitry, the camera and the phased array radar to search for the object within a plurality of progressively smaller field of views until at least one of a most recent direction resolution satisfies the threshold direction resolution or a most recent range resolution satisfies the threshold range resolution; outputting, by the processing circuitry and based on at least one of a most recent direction resolution satisfying the threshold direction resolution or a most recent range resolution satisfying the threshold range resolution, the most recent direction and the most recent range; and navigating, based on the at least one of the most recent direction and the most recent range, the vehicle.

Example 12: The method of example 11, wherein controlling the phased array radar to search for the object is based on the most recent range received from the camera having a finer range resolution compared to the previous range, and wherein controlling the camera to search for the object is based on the most recent direction received from the phased array radar having a finer direction resolution compared to the previous direction.

Example 13: The method of any one of examples 8 through 12, wherein controlling the phased array radar to search for an object within the second field of view comprises emitting and concentrating the radar signal from the first field of view to the second field of view to increase the intensity of the radar signal.

Example 14: The method of any one of examples 8 through 13, wherein a time to search for the object within the second field of view by the phased array radar is less than a time to search for the object within the first field of view by the phased array radar.

Example 15: A system including: a camera; a phased array radar; and processing circuitry configured to: control the phased array radar to search for an object within a first field of view; receive, from the phased array radar, a first direction and a first range of the object, wherein the first direction has a first direction resolution and the first range has a first range resolution; control the camera to search for the object based on the first direction and the first range and within a second field of view that is smaller than the first field of view; receive, from the camera, a second direction of the object, wherein the second direction has a second direction resolution that is finer than the first direction resolution; output at least one of the second direction or the first range; and navigate, based on the at least one of the second direction or the first range, the vehicle.

Example 16: The system of example 15, wherein the processing circuitry is further configured to: control the phased array radar to search for the object based on the second direction and the first range and within a third field of view that is less than at least one of the first field of view of the second field of view; receive, from the phased array radar, a second range of the object, wherein the second range has second range resolution that is finer than the first range resolution; output at least one of the second direction or the second range; and navigate, based on the at least one of the second direction and the second range, the vehicle.

Example 17: The system of example 16, wherein the processing circuitry is further configured to: determine whether the second direction resolution satisfies a threshold direction resolution and whether the second range resolution satisfies a threshold range resolution, wherein outputting at least one of the second direction or the second range is based on at least one of the second direction resolution satisfying the threshold direction resolution or the second range resolution satisfying the threshold range resolution.

Example 18: The method of example 17, wherein the processing circuitry is further configured to: repeatedly control the camera and the phased array radar to search for the object within a plurality of progressively smaller field of views until at least one of a most recent direction resolution satisfies the threshold direction resolution or a most recent range resolution satisfies the threshold range resolution; output, based on at least one of a most recent direction resolution satisfying the threshold direction resolution or a most recent range resolution satisfying the threshold range resolution, the most recent direction and the most recent range; and navigating, based on the at least one of the most recent direction and the most recent range, the vehicle.

Example 19: The system of example 18, wherein the processing circuitry is configured to control the camera to search for the object based on the most recent direction received from the phased array radar having a finer direction resolution compared to the previous direction, and to control the phased array radar to search for the object based on the most recent range received from the camera having a finer range resolution compared to the previous range.

Example 20: The method of any one of examples 15 through 19, wherein the processing circuitry is configured to control the phased array radar to search for an object within the first field of view by emitting a radar signal with a first intensity within the first field of view and to search for the object within the third field of view by emitting a radar signal with a second intensity that is greater than the first intensity via concentrating the signal emitted within the first field of view to be within the third field of view.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method of navigating a vehicle, the method comprising:
   controlling, by processing circuitry, a phased array radar to search for an object within a first field of view;
   receiving, by the processing circuitry and from the phased array radar, a first direction and a first range of the object, wherein the first direction has a first direction resolution and the first range has a first range resolution;
   controlling, by the processing circuitry, a camera to search for the object based on the first direction and the first range received from the phased array radar and within a second field of view that is smaller than the first field of view;
   receiving, by the processing circuitry and from the camera, a second direction of the object, wherein the second direction has a second direction resolution that is finer than the first direction resolution;
   outputting, by the processing circuitry, at least one of the second direction or the first range;
   controlling, by the processing circuitry, the phased array radar to search for the object based on the second direction received from the camera and the first range and within a third field of view that is less than at least one of the first field of view or the second field of view;
   receiving, by the processing circuitry and from the phased array radar, a second range of the object, wherein the second range has second range resolution that is finer than the first range resolution;
   outputting, by the processing circuitry, at least one of the second direction or the second range; and
   navigating, based on the at least one of the second direction and the second range, the vehicle,
   wherein the first direction and the second direction comprises at least one of an azimuth angle or an elevation angle, wherein the first direction resolution and the second direction resolution comprises at least one of an azimuth angle resolution or an elevation angle resolution.

2. The method of claim 1, further comprising:
   determining, by the processing circuitry, whether the second direction resolution satisfies a threshold direction resolution and whether the second range resolution satisfies a threshold range resolution,
   wherein outputting at least one of the second direction or the second range is based on at least one of the second direction resolution satisfying the threshold direction resolution or the second range resolution satisfying the threshold range resolution.

3. The method of claim 2, further comprising:
   repeatedly controlling, by the processing circuitry, the camera and the phased array radar to search for the object within a plurality of progressively smaller fields of view until at least one of a most recent direction resolution satisfies the threshold direction resolution or a most recent range resolution satisfies the threshold range resolution;
   outputting, by the processing circuitry and based on at least one of the most recent direction resolution satisfying the threshold direction resolution or the most recent range resolution satisfying the threshold range resolution, a most recent direction and a most recent range; and
   navigating, based on the at least one of the most recent direction and the most recent range, the vehicle.

4. The method of claim 3, wherein controlling the camera to search for the object is based on the most recent direction received from the phased array radar having a finer direction resolution compared to a previous direction, and
   wherein controlling the phased array radar to search for the object is based on the most recent range received from the camera having a finer range resolution compared to a previous range.

5. The method of claim 1, wherein controlling the phased array radar to search for an object within the first field of view comprises emitting a radar signal with a first intensity within the first field of view, wherein controlling the phased array radar to search for the object within the third field of view comprises emitting a radar signal with a second intensity that is greater than the first intensity via concentrating the signal emitted within the first field of view to be within the third field of view.

6. The method of claim 1, wherein a time to search for the object within the second field of view by the camera is less than a time to search for the object within the first field of view by the camera.

7. A method of vehicle navigation, the method comprising:
   controlling, by processing circuitry, a camera to search for an object within a first field of view;
   receiving, by the processing circuitry and from the camera, a first direction and a first range of the object, wherein the first direction has a first direction resolution and the first range has a first range resolution;
   controlling, by the processing circuitry, a phased array radar to search for the object based on the first direction and the first range received from the camera and within a second field of view that is smaller than the first field of view;
   receiving, by the processing circuitry and from the phased array radar, a second range of the object, wherein the second range has a second range resolution that is finer than the first range resolution;
   outputting, by the processing circuitry, at least one of the first direction or the second range;
   controlling, by the processing circuitry, the camera to search for the object based on the first direction and the second range received from phased array radar and within a third field of view that is less than at least one of the first field of view or the second field of view;
   receiving, by the processing circuitry and from the camera, a second direction of the object, wherein the second direction has second direction resolution that is finer than the first direction resolution;

outputting, by the processing circuitry, at least one of the second direction or the second range; and navigating, based on the at least one of the second direction and the second range, the vehicle, wherein the first direction and the second direction comprises at least one of an azimuth angle or an elevation angle, wherein the first direction resolution and the second direction resolution comprises at least one of an azimuth angle resolution or an elevation angle resolution.

8. The method of claim 7, further comprising:

determining, by the processing circuitry, whether the second direction resolution satisfies a threshold direction resolution and whether the second range resolution satisfies a threshold range resolution, wherein outputting at least one of the second direction or the second range is based on at least one of the second direction resolution satisfying the threshold direction resolution or the second range resolution satisfying the threshold range resolution.

9. The method of claim 8, further comprising:

repeatedly controlling, by the processing circuitry, the camera and the phased array radar to search for the object within a plurality of progressively smaller field of views until at least one of a most recent direction resolution satisfies the threshold direction resolution or a most recent range resolution satisfies the threshold range resolution;

outputting, by the processing circuitry and based on at least one of the most recent direction resolution satisfying the threshold direction resolution or the most recent range resolution satisfying the threshold range resolution, a most recent direction and a most recent range; and navigating, based on the at least one of the most recent direction and the most recent range, the vehicle.

10. The method of claim 9, wherein controlling the phased array radar to search for the object is based on the most recent range received from the camera having a finer range resolution compared to a previous range, and wherein controlling the camera to search for the object is based on the most recent direction received from the phased array radar having a finer direction resolution compared to a previous direction.

11. The method of claim 7, wherein controlling the phased array radar to search for an object within the second field of view comprises emitting and concentrating a radar signal from the first field of view to the second field of view to increase an intensity of the radar signal.

12. The method of claim 7, wherein a time to search for the object within the second field of view by the phased array radar is less than a time to search for the object within the first field of view by the phased array radar.

13. A system for navigating a vehicle, the vehicle comprising:

a camera;

a phased array radar; and processing circuitry configured to:

control the phased array radar to search for an object within a first field of view;

receive, from the phased array radar, a first direction and a first range of the object, wherein the first direction has a first direction resolution and the first range has a first range resolution;

control the camera to search for the object based on the first direction and the first range received from the phased array radar and within a second field of view that is smaller than the first field of view;

receive, from the camera, a second direction of the object, wherein the second direction has a second direction resolution that is finer than the first direction resolution;

output at least one of the second direction or the first range;

control the phased array radar to search for the object based on the second direction received from the camera and the first range and within a third field of view that is less than at least one of the first field of view of the second field of view;

receive, from the phased array radar, a second range of the object, wherein the second range has second range resolution that is finer than the first range resolution;

output at least one of the second direction or the second range; and navigate, based on the at least one of the second direction and the second range, the vehicle wherein the first direction and the second direction comprises at least one of an azimuth angle or an elevation angle, wherein the first direction resolution and the second direction resolution comprises at least one of an azimuth angle resolution or an elevation angle resolution.

14. The system of claim 13, wherein the processing circuitry is further configured to:

determine whether the second direction resolution satisfies a threshold direction resolution and whether the second range resolution satisfies a threshold range resolution, wherein outputting at least one of the second direction or the second range is based on at least one of the second direction resolution satisfying the threshold direction resolution or the second range resolution satisfying the threshold range resolution.

15. The system of claim 14, wherein the processing circuitry is further configured to:

repeatedly control the camera and the phased array radar to search for the object within a plurality of progressively smaller field of views until at least one of a most recent direction resolution satisfies the threshold direction resolution or a most recent range resolution satisfies the threshold range resolution;

output, based on at least one of the most recent direction resolution satisfying the threshold direction resolution or the most recent range resolution satisfying the threshold range resolution, a most recent direction and a most recent range; and navigating, based on the at least one of the most recent direction and the most recent range, the vehicle.

16. The system of claim 15, wherein the processing circuitry is configured to control the camera to search for the object based on the most recent direction received from the phased array radar having a finer direction resolution compared to a previous direction, and to control the phased array radar to search for the object based on the most recent range received from the camera having a finer range resolution compared to a previous range.

17. The system of claim 13, wherein the processing circuitry is configured to control the phased array radar to search for an object within the first field of view by emitting a radar signal with a first intensity within the first field of view and to search for the object within the third field of view by emitting a radar signal with a second intensity that is greater than the first intensity via concentrating the signal emitted within the first field of view to be within the third field of view.

\* \* \* \* \*